Patented Sept. 17, 1929

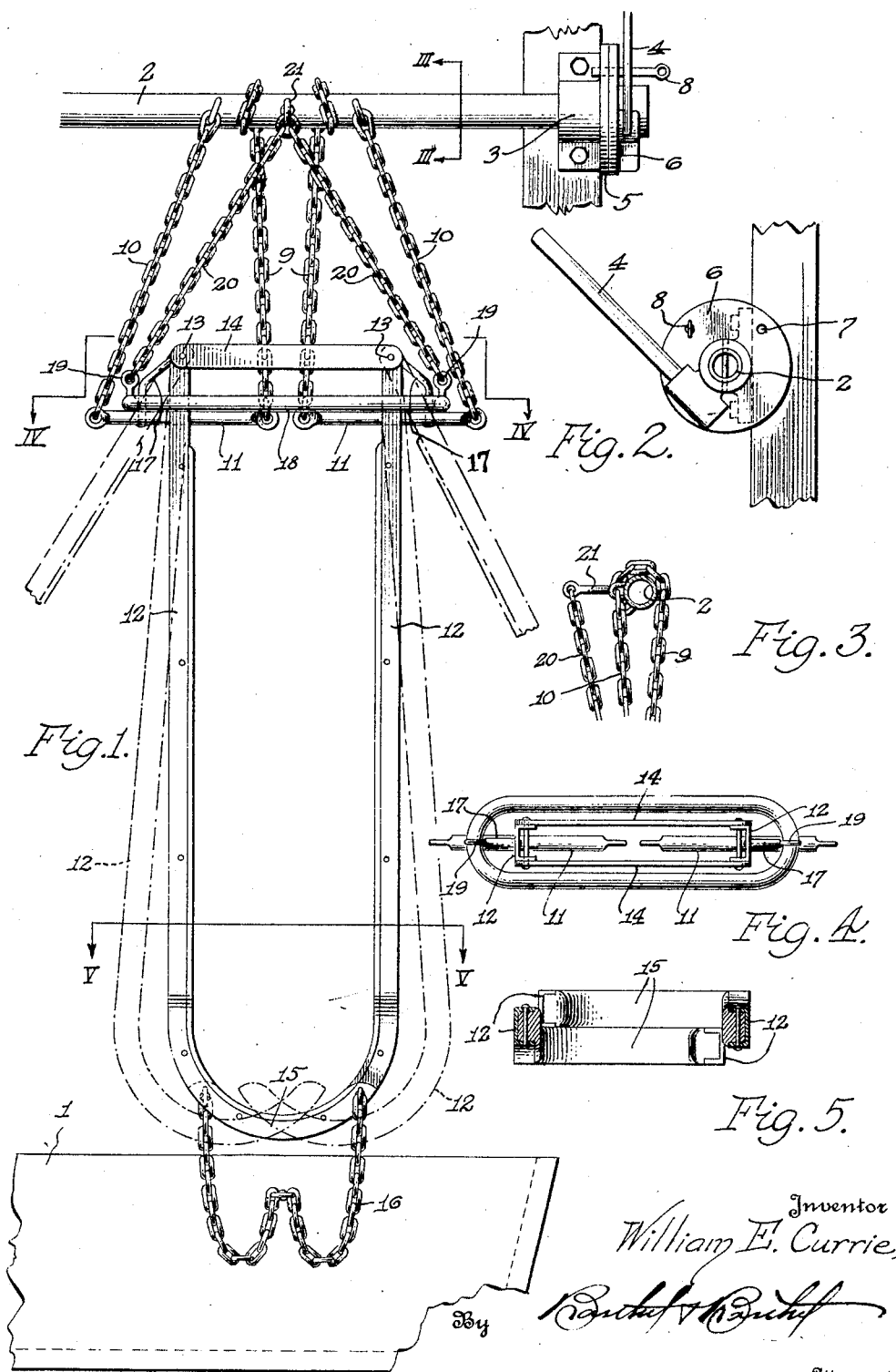

1,728,857

UNITED STATES PATENT OFFICE

WILLIAM E. CURRIE, OF LAKE JOVITA, FLORIDA

CATTLE STANCHION

Application filed November 29, 1926. Serial No. 151,318.

In my Patent No. 1,549,245 granted Aug. 11, 1925, there is disclosed a cattle stanchion embodying neck members or bars, which when in an open position provide a wide bottom opening so that a cow or other animal can quickly assume a position by which the stanchion may be closed to secure the animal in a stall for milking or other purposes.

I have improved this stanchion by simplifying the construction without sacrificing any of the advantages gained by my former stanchion.

This invention will be hereinafter more fully described and then claimed, and reference will now be had to the drawing, wherein Figure 1 is a front elevation of the stanchion in a closed position showing by dot and dash lines two positions the neck members may assume.

Fig. 2 is an end view of a stanchion operating shaft or arbor;

Fig. 3 is a cross sectional view taken on the line III—III of Fig. 1;

Fig. 4 is a plan of a portion of the stanchion, for instance a view taken on the line IV—IV of Fig. 1 with the flexible members removed, and Fig. 5 is a horizontal sectional view taken on the line V—V of Fig. 1.

The reference numeral 1 denotes a manger or feed receptacle and 2 is a shaft or arbor supported in bearings 3 so that it may be rocked by a lever 4 suitably mounted on an end of the shaft. The bearing 3 has a face plate 5 and the lever 4 a face plate 6. Both of these face plates are apertured, as at 7, so that a pin 8 or the like may be placed in the apertures to hold the rock shaft 2 in adjusted position.

Attached to the shaft 2 and adapted to be wound thereon are flexible members 9 and 10, preferably in the form of chains, with the flexible members 9 adapted to be wound on the shaft 2 in an opposite direction from the flexible members 10. The flexible members 9 and 10 are attached to the ends of arms 11 carried by yoke forming bars or neck members 12 which have the upper ends thereof pivotally connected, as at 13, to a coupling member 14. The lower ends of the yoke forming bars or neck members are curved, as at 15 to engage each other, as best shown in Fig. 4, and thus form a yoke. The curved ends 15 may be connected by chains or other flexible members 16 to the feed receptacle 1 with said flexible members limiting the swinging opening movement of the bars 12. The bars 12 may be made of channel members with wood inserts.

Connecting the upper ends of the bars 12 and the outer end portions of the arms 11 are guides 17 for a locking member 18, preferably in the form of an oblong link which has its extremities provided with eye bolts 19 so that said link may be suspended by flexible members 20 from a crank 21 carried by the shaft 2. The crank 2 is placed centrally of the stanchion so as to raise and lower the link 18 when the shaft 2 is rocked, and it is by virtue of the crank 21 that the link is raised in advance of the bars 12 being swung outwardly, otherwise the link 18 engaging the guide 17 retains the bars 12 substantially parallel and closed, such being a locked condition of the stanchion.

When the stanchion is to be unlocked the shaft 2 is rocked to wind the flexible members 10 thereon and permit the flexible members 9 to unwind. Through the medium of the arms 11 the bars 12 will be swung outwardly to an open position, thus widely separating the lower ends of the bars so that a cow may easily place her head through the stanchion, there being no obstruction for the natural position of the cow's head when entering the stall and seeking food in the receptacle 1.

Assuming that a cow is in position and the stanchion is to be closed, the shaft 2 is rocked to wind the flexible members 9 thereon and permit of the flexible members 10 unwinding. In this manner the stanchion is forcibly closed and as such operation takes place the link 18 is lowered over the guide 17, thus locking the yoke forming bars 12 in a closed position defined by the lower curved ends 15 of the bars 12 and the link 18 seating on the arms 11.

With the coupling member 14, link 18 and arms 11 disposed in parallel planes in proximity to one another, the upper portion of the stanchion is out of the road of a cow secured by the stanchion, and with the arms 11 in a plane below the link 18 a cow cannot raise the link 18 and cause release of the stanchion. If a cow's neck should engage the arms 11 upward pressure tends to close the stanchion more firmly and in addition to this are the flexible members 9 holding the yoke forming bars 12 in a closed position.

Compared to my former stanchion it will be noted that the scissor or tong like action has been dispensed with, the overall longitudinal dimension of the stanchion reduced and the action made more positive. The stanchion may be placed in closer proximity to the operating shaft or arbor and by virtue of the arms 11 a degree of leverage is attained for opening and closing the stanchion.

Obviously my invention is susceptible to such changes as are permissible by the appended claims.

What I claim is:—

1. An animal stanchion comprising bars having spaced upper ends, a coupling member connecting said upper ends and maintaining them in spaced relation so that the lower ends of said bars may be swung to provide a wide head and neck receiving opening, shiftable locking means over the pivoted ends of said bars adapted to retain said bars in closed yoke forming positions, means adapted for swinging said bars to open positions, and means adapted to shift said locking means in advance of the first mentioned means.

2. An animal stanchion comprising a neck yoke composed of bars having lower adjacent ends, spacing means for the upper ends of said bars, laterally disposed arms carried by said bars and projecting inwardly and outwardly from said arms, and flexible suspension means attached to the inner and outer ends of said arms and adapted for opening and closing said bars.

3. An animal stanchion comprising a neck yoke composed of bars having lower adjacent ends, laterally extending arms carried by the upper ends of said bars and projecting inwardly and outwardly therefrom, and flexible suspension means attached to the ends of said arms and adapted for shifting said arms to swing said bars, the position of the inner ends of said bars being such that upward movement of the inner ends of said arms secures said stanchion in a closed position.

4. An animal stanchion comprising a neck yoke composed of bars having their lower ends mutually adjacent, laterally extending arms carried by the upper ends of said bars and projecting inwardly, means for suspending said arms from an overhead support, a locking member slidable over the upper ends of said bars and above said arms, and means for releasing and applying said locking member relative to said bars.

In testimony whereof I affix my signature.

WILLIAM E. CURRIE.